US012775854B2

(12) United States Patent
Jones et al.

(10) Patent No.: US 12,775,854 B2
(45) Date of Patent: Oct. 27, 2026

(54) CONTENT MATCHING ATTRIBUTION BASED ON A CONTENT RECOMMENDATION FROM A GENERATIVE AI MODEL

(71) Applicant: Red Hat, Inc., Raleigh, NC (US)

(72) Inventors: Matthew Wayne Jones, Durham, NC (US); Scott Robinson Harwell, Raleigh, NC (US); Richard Gebhardt, Raleigh, NC (US); Brian Lee King, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/537,787

(22) Filed: Dec. 12, 2023

(65) Prior Publication Data

US 2025/0190822 A1 Jun. 12, 2025

(51) Int. Cl.

| | |
|---|---|
| ***G06F 16/2457*** | (2019.01) |
| ***G06F 16/22*** | (2019.01) |
| ***G06N 3/08*** | (2023.01) |
| ***G06N 5/04*** | (2023.01) |

(52) U.S. Cl.

CPC ............... *G06N 5/04* (2013.01); *G06F 16/22* (2019.01); *G06F 16/2457* (2019.01); *G06N 3/08* (2013.01)

(58) Field of Classification Search

CPC .. G06N 5/04; G06N 3/08; G06F 16/22; G06F 16/2457

See application file for complete search history.

(56) References Cited

U.S. PATENT DOCUMENTS

| | | | | |
|---|---|---|---|---|
| 10,115,146 B1 * | 10/2018 | Anderson | .......... | G06Q 30/0631 |
| 2020/0104235 A1 * | 4/2020 | Mathur | ............... | G06F 11/3688 |
| 2022/0075961 A1 * | 3/2022 | Cavallari | ............... | G06N 20/00 |

(Continued)

OTHER PUBLICATIONS

Sun et al. Code Recommendation Based on Deep Learning, 2023 12th International Conference of Information and Communication Technology (ICTech), Apr. 2023, pp. 156-160. (Year: 2023).*

(Continued)

*Primary Examiner* — Cheyne D Ly

(74) *Attorney, Agent, or Firm* — Womble Bond Dickinson (US) LLP

(57) ABSTRACT

Techniques that provide source metadata associated with code recommendations generated by an automation controller are described. A training data set comprising queries, code recommendations and source metadata associated with each of the code recommendations may be stripped of the source metadata and encoded by an NLP model to generate vector representations of each code recommendation. Each vector representation is stored in an index in association with the source metadata corresponding to the underlying code recommendation. In response to receiving a query, the query is processed using an inference model to generate a second code recommendation, which is encoded using the NLP model to generate a second vector representing the second code recommendation. The second vector is compared to the index to identify the source metadata corresponding to the second code recommendation. The second code recommendation and corresponding source metadata are provided via an interface of the automation controller.

20 Claims, 6 Drawing Sheets

(56) References Cited

U.S. PATENT DOCUMENTS

2022/0279004 A1* 9/2022 Erlingsson .......... G06F 16/9024

OTHER PUBLICATIONS

S. Kwon, S. Lee, T. Kim, D. Ryu, J. Baik, Exploring the feasibility of chatgpt for improving the quality of ansible scripts in edge-cloud infrastructures through code recommendation, in: International Conference on Web Engineering, Springer, Jun. 6-9, 2023, pp. 75-83. (Year: 2023).*

Sifei Luan, Di Yang, Celeste Barnaby, Koushik Sen, and Satish Chandra. 2019. Aroma: Code Recommendation via Structural Code Search. Proc. ACM Program. Lang. 3, Oopsla, Article 152 (Oct. 2019), 28 pages. (Year: 2019).*

Wen, W., Zhao, T., Wang, S. et al. Code recommendation based on joint embedded attention network. Soft Comput 26, 8635-8645 (2022) (Year: 2022).*

* cited by examiner

FIREWALL MONITORING AND SECURITY EVENT ANALYSIS – CODE RECOMMENDATION 1 – SM1

NETWORK LOAD MANAGEMENT AND TELEMETRY – CODE RECOMMENDATION 2 – SM2

PRIVATE CLOUD INSTANTIATION – CODE RECOMMENDATION 3 – SM3

ENERGY MONITORING – CODE RECOMMENDATION 4 – SM4

CI/CD PIPELINE – CODE RECOMMENDATION 5 – SM5

*FIG. 2B*

CONTENT MATCHING ATTRIBUTION BASED ON A CONTENT RECOMMENDATION FROM A GENERATIVE AI MODEL

TECHNICAL FIELD

Aspects of the present disclosure relate to content recommendations, and more particularly, to providing content recommendations that include associated source metadata regarding the recommended content.

BACKGROUND

Ansible is a popular open-source suite of software tools that can be used to automate a variety of operations related to computing resources, including configuration management, application deployment, cloud provisioning, task execution, network automation, and multi-node orchestration. In the past, such operations would generally be performed by a human operator that logs into a computing system to manually perform tasks. As computing infrastructure increases in size and complexity, the manual performance of these tasks may become time consuming and error prone. The automation provided by Ansible can be used to orchestrate changes over thousands of devices while reducing the level of human involvement in provisioning, installing, configuring, and maintaining computing resources. Ansible-based services may be provided as a subscription product such as the Red Hat® Ansible® Automation Platform.

The functionality of such automation tools often extends to include automated generation of code. More specifically, such tools may accept prompts entered by a user and then interacts with one or more machine learning models to produce code recommendations built on Ansible best practices. To do this, automation tools often utilize a machine learning model such as a Large Language Model (LLM) that has been trained using training data sets that include e.g., user queries and associated code. In this way, such models can offer insightful and contextually relevant code recommendations in response to user queries. For example, a query related to implementing a specific feature might prompt the machine learning model to provide code snippets or outline programming structures that could achieve the desired functionality.

In the rapidly evolving landscape of artificial intelligence and natural language processing, Large Language Models (LLMs) have emerged as pivotal tools for understanding and generating human-like text. A key factor driving the effectiveness of LLMs is their ability to leverage expansive and diverse datasets during both training and inference stages. As discussed above, LLMs are trained using extensive datasets that encompass a wide array of data types. These datasets serve as instructional material that allows an LLM to learn intricate linguistic patterns, grammatical structures, and contextual relationships present in human language. The training process involves iteratively presenting the LLM with examples from the dataset and adjusting its internal parameters to minimize the disparity between its predictions and the actual text. This enables the LLM to acquire a nuanced understanding of language semantics, enhancing its capacity to generate coherent and contextually appropriate responses.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2B illustrates a training data set including source metadata associated with each of a plurality of code recommendations, in accordance with some embodiments of the present disclosure.

DETAILED DESCRIPTION

Figure 1:
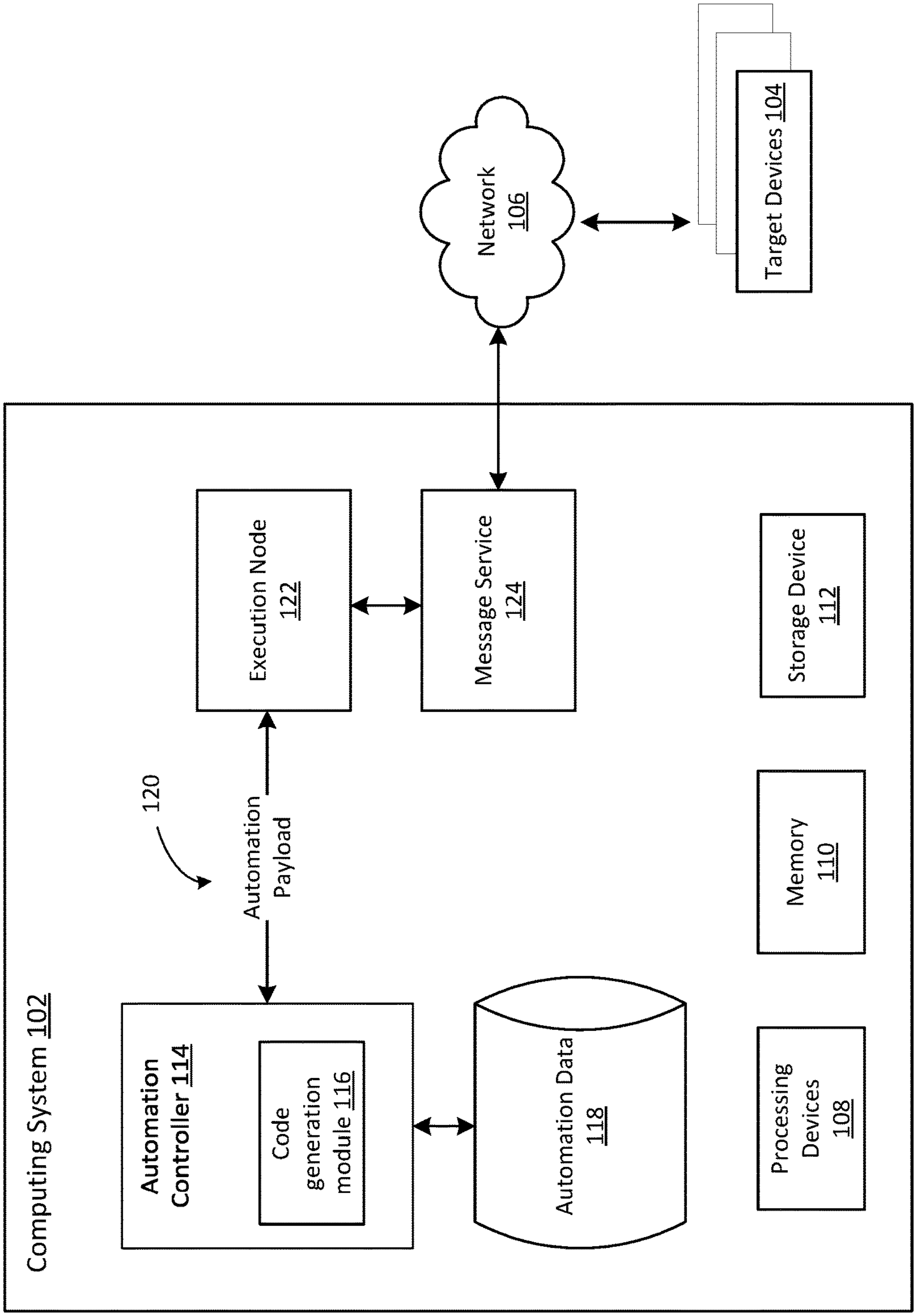
FIG. 1 is a block diagram that illustrates an example system in which an automation tool can be implemented, in accordance with some embodiments of the present disclosure.

Code recommendations produced by automation tools are often devoid of information regarding a source of the code snippets or programming structures included in the code recommendations. Such source information can aid a user of an automation tool in a number of ways. For example, a uniform resource link (URL) to the data source location where the code snippets or programming structures are stored along with a direct path to the code snippets or programming structures may allow a user to browse other material that is related to the code snippets or programming structures included in the code recommendations. In another example, source metadata indicating a type (e.g., repository, documentation etc.) of the data source of the code snippets or programming structures, and a code/asset type (e.g., Ansible playbook) of the code snippets or programming structures may allow the user to assess compatibility and other issues.

Because code recommendations produced by automation tools often do not include source information as discussed above, a user of such an automation tool often does not have information that is critical to their use of code snippets and/or programming structures within code recommendations generated by automation tools.

The present disclosure addresses the above-noted and other deficiencies by providing an index of code recommendations and associated source metadata for each code recommendation. Code recommendations generated in response to received queries are compared to the index to determine the source information that should be presented along with the code recommendations generated in response to the queries.

An index may be generated based on a special training data set comprising inputs (queries), expected outputs (code recommendations) and source metadata associated with each of the code recommendations. The training data set may stripped of source metadata and encoded by an NLP model to generate vector representations of each code recommendation. Each vector representation may be stored in the index in association with the source metadata corresponding to the underlying code recommendation. In response to receiving a query, the query may be processed using an inference model to generate a second code recommendation, which may be encoded using the NLP model to generate a second vector representing the second code recommendation. The second vector may be compared to the index to identify the source metadata corresponding to the second code recommendation. The second code recommendation and the source metadata corresponding to the second code recommendation may be provided e.g., via an interface of the automation controller that the query is received from.

A training data set used to train the inference model may include a set of inputs and a set of expected outputs that match the set of inputs and set of expected outputs of the special training data set, but may not include the source metadata included in the special training data set. Thus, the techniques described herein provide source metadata for code recommendations that the inference model has already been trained on, and as a result the degree of accuracy they can provide with respect to matching the second vector to a vector in the index (and thereby identifying the correct source metadata) is relatively high.

FIG. 1 is a block diagram of an example computing system 102 that can be used to host an automation platform in accordance with some embodiments of the present disclosure. One skilled in the art will appreciate that other architectures are possible for computing system 102 and any components thereof, and that the implementation of a system utilizing examples of the disclosure are not necessarily limited to the specific architecture depicted by FIG. 1. The computing system 102 may be a cloud-based infrastructure configured, for example, as Service as a Service (SaaS) or Platform as a Service (PaaS). The computing system 102 may also be a non-cloud-based system such as a personal computer, one or more servers communicatively coupled through a network, and other configurations.

The computing system 102 may be coupled to target devices 104 through a network 106. Both the computing system 102 and each of the target devices 104 may be any suitable type of computing device or machine that has a programmable processor including, for example, server computers, desktop computers, laptop computers, smartphones, Internet of Things (IoT) devices (e.g., sensors, household appliances, home automation devices, etc.), network devices (switches, routers), vehicular systems (e.g., airplanes, ships, trains, automobiles), satellite electronics, industrial control systems, and others. In some examples, the computing system 102 and each of the target devices 104 may comprise a single machine or may include multiple interconnected machines (e.g., multiple servers configured in a cluster). The computing system 102 and target devices 104 may be implemented by a common entity/organization or may be implemented by different entities/organizations.

The network 106 may be a public network (e.g., the internet), a private network (e.g., a local area network (LAN) or wide area network (WAN)), or a combination thereof. In one embodiment, the network 106 may include a wired or a wireless infrastructure, which may be provided by one or more wireless communications systems, such as a Wi-Fi router connected with the network 106 and/or a wireless carrier system such as 4G or 5G that can be implemented using various data processing equipment, communication towers (e.g., cell towers), etc. In some embodiments, the network 106 may be an L3 network. The network 106 may carry communications (e.g., data, messages, packets, frames, etc.) between the computing system 102 and the target devices 104.

The computing system 102 can include one or more processing devices 108 (e.g., central processing units (CPUs), graphical processing units (GPUs), etc.), main memory 110, which may include volatile memory devices (e.g., random access memory (RAM)), non-volatile memory devices (e.g., flash memory) and/or other types of memory devices, and a storage device 112 (e.g., one or more magnetic hard disk drives, a Peripheral Component Interconnect [PCI] solid state drive, a Redundant Array of Independent Disks [RAID] system, a network attached storage [NAS] array, etc.). In certain implementations, main memory 110 may be non-uniform access (NUMA), such that memory access time depends on the memory location relative to processing device 108. The storage device 112 may be a persistent storage and may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The storage device 112 may be configured for long-term storage of data. It should be noted that although, for simplicity, a single processing device 108, main memory 110, storage device 112, are shown, other embodiments may include a plurality of processing devices, memories, and storage devices. Additionally, the computing system 102 may have additional components not shown in FIG. 1. The target devices 104 may include similar architectures.

In some embodiments, the computing system 102 may be configured as a scalable, distributed computing system, such as a container orchestration platform. A container orchestration platform is a platform for developing and running containerized applications and may allow applications and the data centers that support them to expand from just a few machines and applications to thousands of machines that serve millions of clients. Container orchestration platforms may provide an image-based deployment module for creating containers and may store one or more image files for creating container instances. Many application instances can be running in containers on a single host without visibility into each other's processes, files, network, and so on. Each container may provide a single function (often called a "service") or component of an application, such as a web server or a database, though containers can be used for arbitrary workloads. The container orchestration platform may scale a service in response to workloads by instantiating additional containers with service instances in response to an increase in the size of a workload being processed by the nodes. One example of a container orchestration platform in accordance with embodiments is the Red Hat™ OpenShift™ platform built around Kubernetes.

The computing system 102 may include an automation controller 114 which may comprise an automation tool such as Red Hat Ansible™, which is an open-source automation tool that allows users to automate the configuration, management, and deployment of systems and applications. The automation controller 114 may allow users to define their infrastructure as code using e.g., YAML (Yet Another Markup Language), which is a declarative language. The automation controller 114 may use a client-server architecture, where a central machine, known e.g., as the control node, manages and orchestrates the automation process. The control node connects to the target devices 104 over SSH (Secure Shell protocol) or other protocols and executes tasks that are included in "playbooks." Ansible playbooks define a set of tasks and configurations to be executed on remote systems. A playbook includes one or more plays, and each play includes a set of tasks. Plays are a collection of tasks that are executed together on a group of hosts or a set of hosts defined by patterns. Tasks within a playbook define actions to be performed on the target hosts, such as installing packages, copying files, starting, or stopping services, executing commands, configuring network settings, etc.

The automation controller 114 may be coupled to a database of automation data 118 that can be used to create a playbook. For example, the automation data 118 may include an inventory of target devices, scripts and/or code modules to be executed on the target devices, and other information. The playbook may be initiated manually by the user or in accordance with a schedule defined by the user. A playbook may be sent by the automation controller 114 to an execution node 122, which executes the playbook and collects status information from the target devices 104. In some embodiments, the execution node 122 may be configured to launch one or more containers for executing the playbook in a distributed computing system.

Once launched, the playbook directs the operations of the computing system 102 to distribute units of automation, referred to herein as automation packages, to the target devices 104. The automation packages may be encapsulated in messages to be delivered to a message service 124, which handles communication between the execution node 122 and the target devices 104. The playbook may be configured to perform any of a variety of automated tasks, such as executing software updates (e.g., patches), implementing configuration changes, provisioning cloud resources, and others. For example, the playbook may be configured to perform tasks related to a user's Information Technology (IT) infrastructure, such as provisioning infrastructure, improving security and compliance, installing software, patching system, and others. In some embodiments, the playbook may be configured to target devices that may not have consistent and reliable access to the network 106, such as automobiles or other types of vehicles (e.g., ships, boats, planes, tractor-trailers, etc.). Those of ordinary skill in the art will recognize a wide variety of additional applications for the techniques described herein.

As discussed herein, the functionality of the automation controller 114 may extend to include automated generation of code. The automation controller 114 may include a code generation module 116 that produces responses that include relevant code recommendations in response to user queries. The code generation module 116 may be for example the Ansible Lightspeed™ service which is a generative AI service that utilizes machine learning models and natural language processing to turn written prompts into code recommendations for the creation of Ansible playbooks. The code generation module 116 may include an inference model 205 (shown in FIG. 2A) that is trained to analyze input queries and produce relevant code recommendations in response thereto.

For example, the inference model 205 may be implemented as an LLM which employs advanced neural network architectures to understand, generate, and manipulate human language with a high degree of proficiency. LLMs utilize expansive and diverse datasets to train their neural networks, enabling them to learn language patterns, semantics, and contextual relationships necessary for understanding and generating coherent and contextually relevant responses. LLMs also have the ability to leverage expansive and diverse datasets during both training and inference stages to increase their efficiency.

Datasets are collections of structured or unstructured data that serve as the foundation for training LLMs, providing examples that enable the models to learn patterns and generate predictions. In addition to text, images, and other forms of data, datasets can also encompass software code snippets, enhancing the capability of LLMs to understand and generate programming-related content. For example, a query related to implementing a specific feature might prompt an LLM to provide code recommendations or outline programming structures that could achieve the desired functionality.

The code generation training data set 119 may include a set of inputs (not shown), where each input in the set of inputs may comprise a user query. As shown in FIG. 2B, each query may comprise text regarding implementing a specific feature or desired functionality. Example queries include "firewall monitoring and security event analysis," "network load management and telemetry" and "private cloud instantiation," among others. The code generation training data set 119 may further include an expected output for each of the set of inputs, and each expected output may comprise a code recommendation. A code recommendation may comprise code snippets and/or outline programming structures that can achieve the desired functionality as indicated by the corresponding input. In addition, the code generation training data set 119 may further include source metadata (SM1, SM2 . . . . SM5) associated with each of the code recommendations (expected outputs). Such source metadata may include a source location of the code recommendation (e.g., github/gitlab repository URL), a path within the source location where the code recommendation can be located/accessed, a source license, a data source type (e.g., repository, documentation etc.), and a code/asset type (e.g., Ansible playbook). A training data set used to train the inference model 205 may include a set of inputs and a set of expected outputs that match the set of inputs and set of expected outputs of the code generation training data set 119, but may not include the source metadata included in the code generation training data set 119.

In some embodiments, the code generation training data set 119 may also include fine-tuning data sets that can be used to expand the number of code recommendations the index 220 has corresponding source metadata and/or improve the accuracy of the index 220 (i.e., ensure that each code recommendation is stored in association with the correct source metadata). The fine-tuning data sets may include additional user queries, corresponding additional code recommendations, and source metadata corresponding to each additional code recommendation.

Figure 2A:
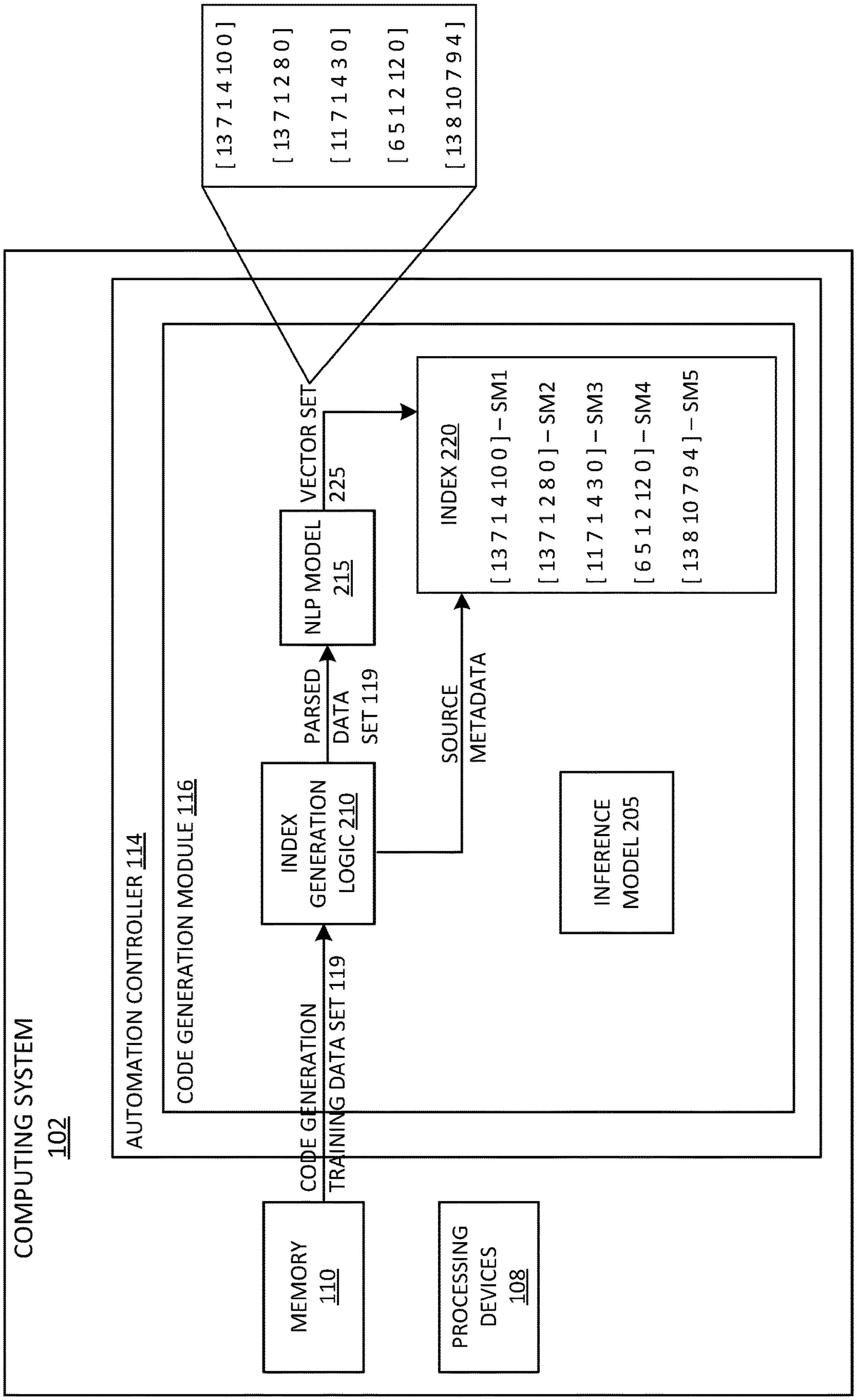
FIG. 2A is a block diagram that that illustrates the system of FIG. 1, implementing an automation tool including index generation and natural language processing (NLP) functionality, in accordance with some embodiments of the present disclosure.

FIG. 2A illustrates the computing system 102 with the code generation module 116 implemented with a natural language processing (NLP) model 215 in addition to the inference model 205. The NLP model 215 may perform text encoding which is a process to convert text into number or vector representation so as to preserve the context and relationship between words and sentences, such that a machine can understand the pattern associated with any text and can make out the context of sentences.

The code generation model 119 may further include index generation logic 210 which may include logic to parse the code generation training data set 119 and extract the source metadata. The NLP model 215 may encode the code recommendations (expected outputs) of the parsed code generation training data set 119 (now devoid of the source metadata) to generate a vector set 225 that includes, for each of the code recommendations of the code generation training data set 119, a vector comprising a text representation of the code recommendation. FIG. 2A illustrates the vector set 225 in an example where the NLP model 215 uses index-based encoding, however the NLP model 215 may use any appropriate encoding technique such as e.g., TF-IDF encoding or BERT encoding among others. The index generation logic 210 may create an index 220 using the vector set 225 by storing the vector corresponding to each of the code recommendations from the vector set 225 in the index 220 in association with its corresponding source metadata (SM1, SM2 . . . . SM5) as shown in FIG. 2A.

Figure 3:
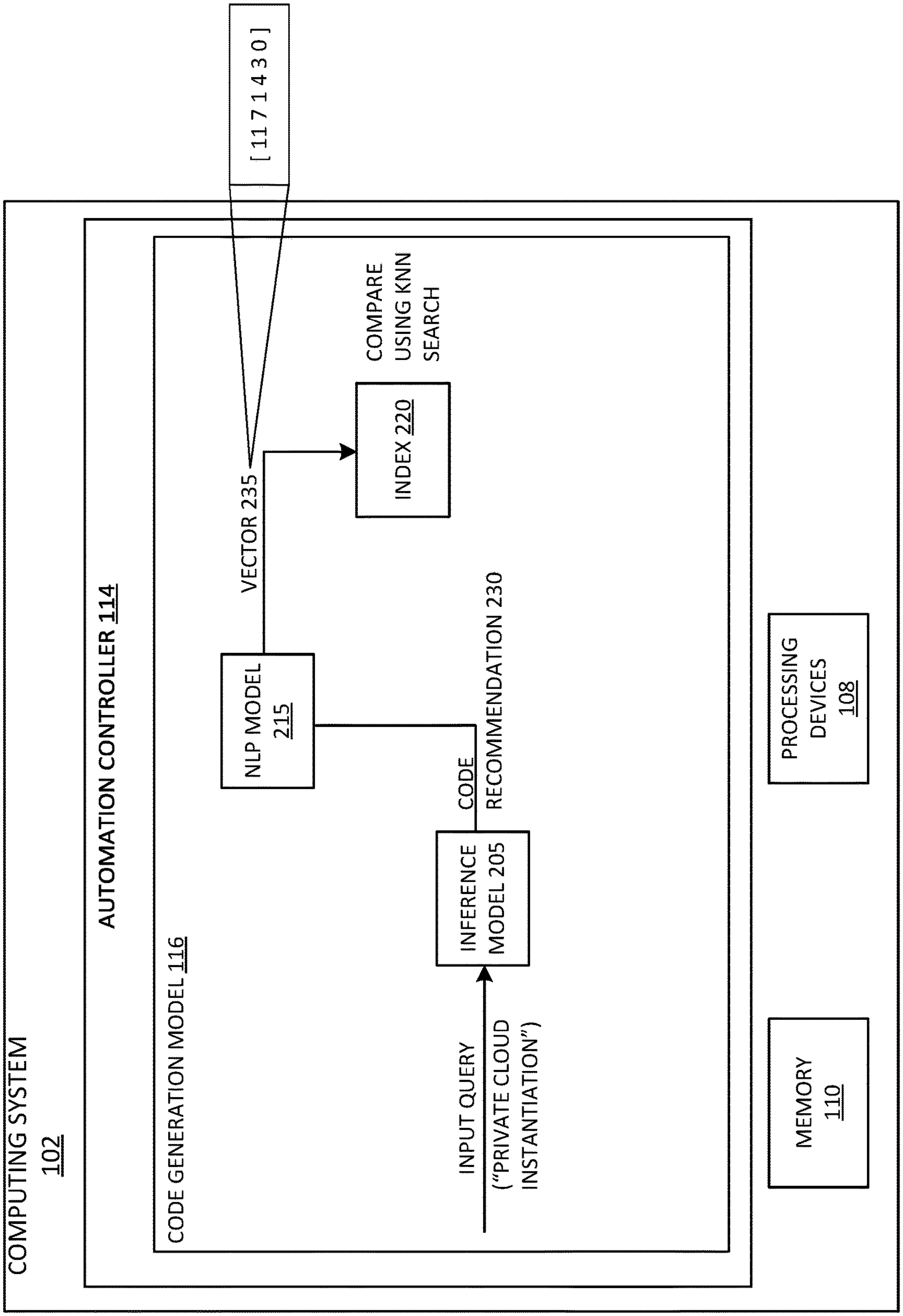
FIG. 3 is a block diagram that illustrates the system of FIG. 2, with the automation tool performing a search of an index, in accordance with some embodiments of the present disclosure.

Referring now to FIG. 3, a user may input a query comprising text regarding implementing a specific feature or desired functionality. In the example of FIG. 3, the query may be "private cloud instantiation." The inference model 205 may analyze the input query and generate a code recommendation 230. The NLP model 215 may encode the code recommendation 230 to generate a vector 235 that comprises a text representation of the code recommendation 230. In the example of FIG. 3, the vector 235 may be [11 7 1 4 3 0] (continuing the example of FIG. 2 where the NLP model 215 uses index-based encoding).

The code generation module 116 may compare the vector 235 to the index 220 to identify the code recommendation of the code generation training data set 119 that most closely matches the code recommendation 230 generated in response to the input query. More specifically, the code generation module 116 may perform a search against the index 220 using any appropriate search algorithm to return the vector of the index 220 that most closely matches the vector 235 (i.e., the code recommendation 230 generated in response to the input query). For example, the code generation module 116 may utilize the k-nearest neighbors (kNN) search algorithm which finds the k nearest vectors (from the index 220) to a query vector (vector 235), as measured by a similarity metric. The kNN search may generate a proximity score for each of the vectors in the index 220, and the vector with the highest proximity score may be identified as the vector of the index 220 that most closely matches the vector 235. In the example of FIG. 3, the code generation module 116 may identify the vector [11 7 1 4 3 0] from the index 220 as most closely matching the vector 235. In some embodiments, the code generation module 116 may display each vector of the index 220 in order of their computed proximity score to the user via the user interface of the automation controller 114.

Upon identifying the vector of the index 220 that most closely matches the vector 235, the code generation module 116 may retrieve the source metadata associated with the identified vector (i.e., the source metadata associated with the identified code recommendation from the code generation training data set 119). In the example of FIG. 3, the code generation module 116 may retrieve the source metadata SM3 associated with the entry [11 7 1 4 3 0] and provide the source metadata SM3 along with the code recommendation 230 to the user. In this way, the user may have access to information regarding the source of the code recommendation 230. The code recommendation 230 and the source metadata SM3 may be provided via a user interface of the automation controller 114 so that the user does not have to switch to a different interface to view the results.

As discussed herein, the source metadata SM3 may indicate a type of the data source as well as provide a link (e.g., URL) to the data source location where the underlying code/programming structure of the code recommendation 230 is stored along with a direct path to the source material (underlying code/programming structure) so that it is easier for a user to browse other material that is related to the code recommendation 230. The source metadata SM3 also indicates a type (e.g., repository, documentation etc.) of the data source of the underlying code/programming structure of the code recommendation 230, and a code/asset type (e.g., Ansible playbook) of the underlying code/programming structure of the code recommendation 230 so the user has a complete set of information regarding the code recommendation 230 which will aid in the use of the code recommendation 230.

As discussed herein, the training data set used to train the inference model 205 may include a set of inputs and a set of expected outputs that match the set of inputs and set of expected outputs of the code generation training data set 119, but may not include the source metadata included in the code generation training data set 119. As a result, the techniques described herein provide source information for code recommendations that the inference model has already been trained on, and as a result the degree of accuracy they can provide with respect to matching the vector 235 (i.e., the code recommendation 230) to a vector in the index 220 (and thereby identifying the correct source metadata) is relatively high.

Figure 4:
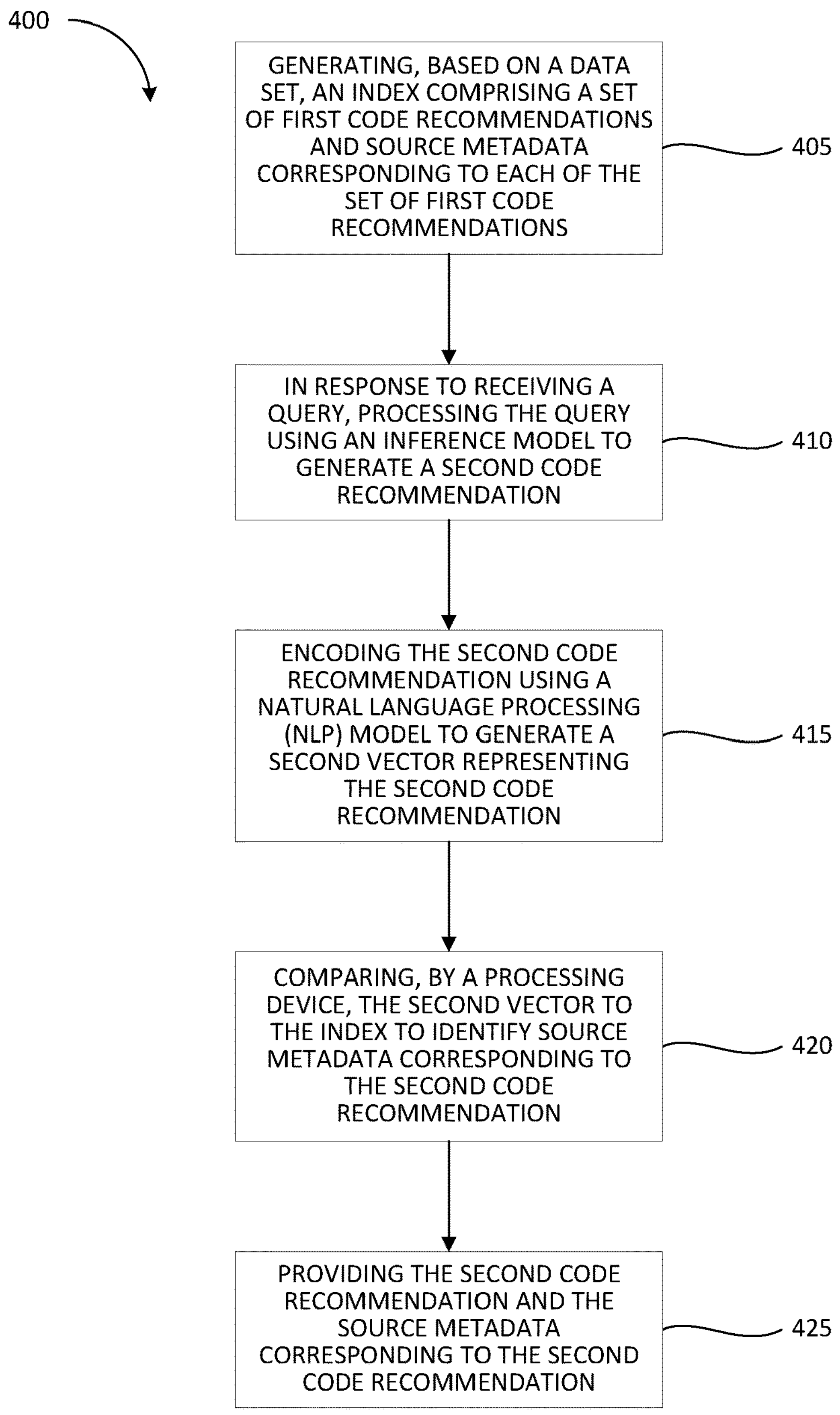
FIG. 4 is a flow diagram of a method for providing code recommendations and corresponding source metadata in response to user queries, in accordance with some embodiments of the present disclosure.

FIG. 4 is a flow diagram of a method 400 for providing code recommendations and corresponding source metadata in response to user queries, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by the computing system 102 executing the automation controller 114.

Method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference also to FIGS. 2 and 3, the method 400 begins at block 405, where the code generation module 116 may generate, based on the code generation training data set 119, an index 220 comprising a set of code recommendations and source metadata corresponding to each of the set of code recommendations. More specifically, the NLP model 215 may encode the code recommendations (expected outputs) of the parsed code generation training data set 119 (now devoid of the source metadata) to generate a vector set 225 that includes, for each of the code recommendations of the code generation training data set 119, a vector comprising a text representation of the code recommendation. FIG. 2A illustrates the vector set 225 in an example where the NLP model 215 uses index-based encoding, however the NLP model 215 may use any appropriate encoding technique such as e.g., TF-IDF encoding or BERT encoding among others. The index generation logic 210 may create an index 220 using the vector set 225 by storing the vector corresponding to each of the code recommendations from the vector set 225 in the index 220 in association with its corresponding source metadata (SM1, SM2 . . . . SM5) as shown in FIG. 2A.

Referring now to FIG. 3, a user may input a query comprising text regarding implementing a specific feature or desired functionality. In the example of FIG. 3, the query may be "private cloud instantiation." The inference model 205 may analyze the input query and at block 410 may generate a code recommendation 230. At block 415 the NLP model 215 may encode the code recommendation 230 to generate a vector 235 that comprises a text representation of the code recommendation 230. In the example of FIG. 3, the vector 235 may be [11 7 1 4 3 0] (continuing the example of FIG. 2 where the NLP model 215 uses index-based encoding).

At block 420, the code generation module 116 may compare the vector 235 to the index 220 to identify the code recommendation of the code generation training data set 119 that most closely matches the code recommendation 230 generated in response to the input query. More specifically, the code generation module 116 may perform a search against the index 220 using any appropriate search algorithm to return the vector of the index 220 that most closely matches the vector 235 (i.e., the code recommendation 230 generated in response to the input query). For example, the code generation module 116 may utilize the k-nearest neighbors (kNN) search algorithm which finds the k nearest vectors (from the index 220) to a query vector (vector 235), as measured by a similarity metric. The kNN search may generate a proximity score for each of the vectors in the index 220, and the vector with the highest proximity score may be identified as the vector of the index 220 that most closely matches the vector 235. In the example of FIG. 3, the code generation module 116 may identify the vector [11 7 1 4 3 0] from the index 220 as most closely matching the vector 235.

Upon identifying the vector of the index 220 that most closely matches the vector 235, the code generation module 116 may retrieve the source metadata associated with the identified vector (i.e., the source metadata associated with the identified code recommendation from the code generation training data set 119). In the example of FIG. 3, the code generation module 116 may retrieve the source metadata SM3 associated with the entry [11 7 1 4 3 0] and provide the source metadata SM3 along with the code recommendation 230 to the user. In this way, the user may have access to information regarding the source of the code recommendation 230. At block 425, the code recommendation 230 and the source metadata SM3 may be provided via a user interface of the automation controller 114 so that the user does not have to switch to a different interface to view the results. In some embodiments, the code generation module 116 may display each vector of the index 220 in order of their computed proximity score to the user via the user interface of the automation controller 114.

Figure 5:
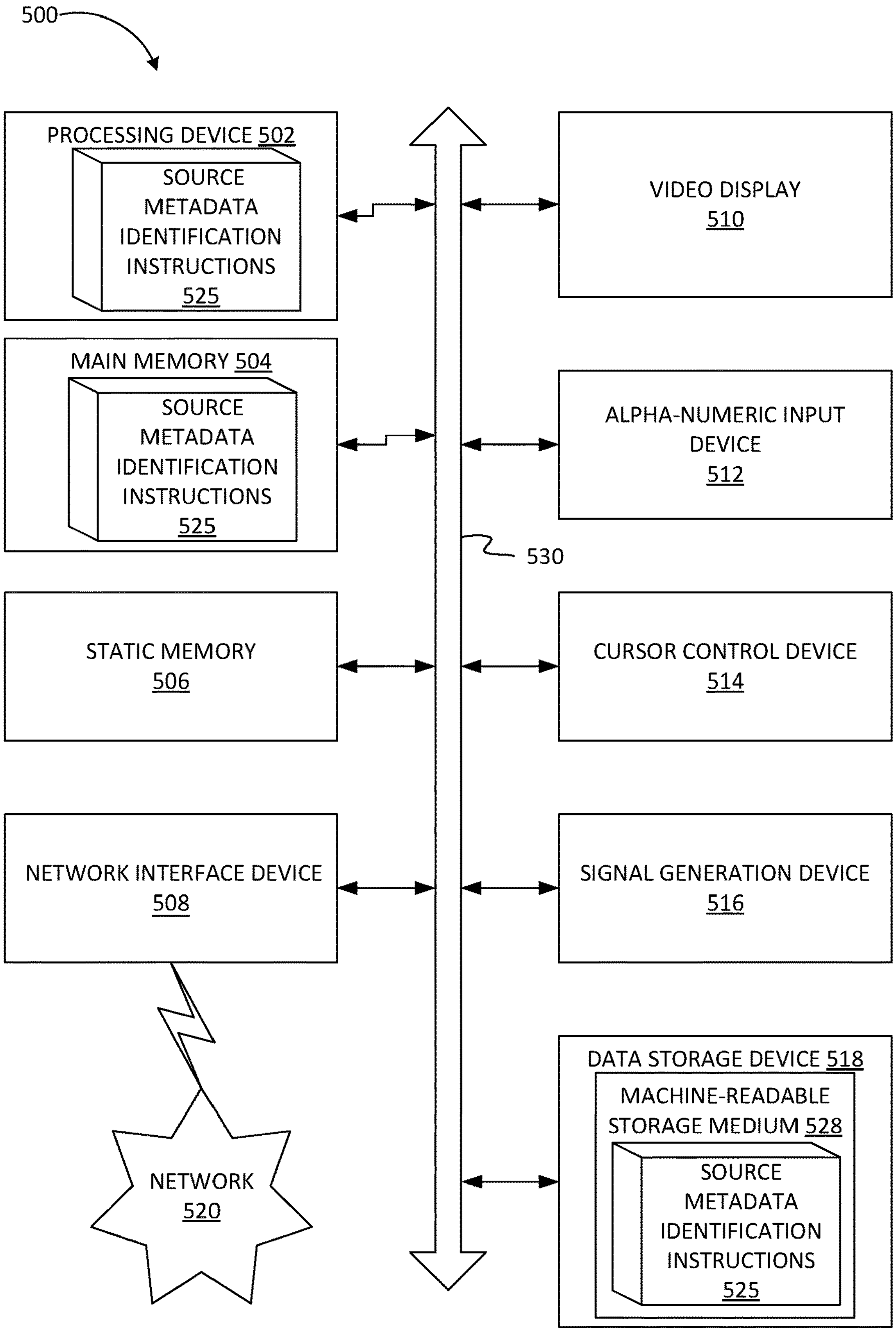
FIG. 5 is a block diagram of an example computing device that may perform one or more of the operations described herein, in accordance with some embodiments of the present disclosure.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also include one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of source metadata identification instructions 525 that may include instructions for one or more components, agents, and/or applications (e.g., code generation module 116 in FIGS. 2 and 3) for carrying out the operations described herein, in accordance with one or more aspects of the present disclosure. The source metadata identification instructions 525 may also reside, completely or at least partially, within main memory 504 and/or within processing device 502 during execution thereof by computing device 500, main memory 504 and processing device 502 also constituting computer-readable media. The source metadata identification instructions 525 may further be transmitted or received over a communication network 520 via network interface device 508. The source metadata identification instructions 525 may also be stored in the main memory 504.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "processing," "encoding," "comparing," "providing," "computing," "identifying," "using," "extracting," "ranking," "training," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

parsing a data set comprising a set of first code recommendations to remove from the set of first code recommendations, source metadata associated with each of the set of first code recommendations;

generating, based on the data set, an index comprising a vector representation of each of the set of first code recommendations by storing the vector representation for each of the set of first code recommendations in association with the source metadata associated with that first code recommendation;

in response to receiving a query, processing the query using an inference model to generate a second code recommendation;

encoding the second code recommendation using a natural language processing (NLP) model to generate a second vector representing the second code recommendation;

comparing, by a processing device, the second vector to the index to identify source metadata corresponding to the second code recommendation; and providing the second code recommendation and the source metadata corresponding to the second code recommendation.

2. The method of claim 1, wherein generating the index further comprises:

encoding, using the NLP model, the set of first code recommendations to generate the vector representation of each of the set of first code recommendations, the vector representation of each of the set of first code recommendations comprising a text representation of the corresponding first code recommendation of the set of first code recommendations; and generating the index, wherein the vector representation of each of the set of first code recommendations is stored in the index in association with the source metadata associated with the first code recommendation.

3. The method of claim 2, wherein the inference model is trained using a training data set that is similar to the data set but does not include source metadata corresponding to each of the set of first code recommendations.

4. The method of claim 1, wherein comparing the second vector to the index comprises:

using a search algorithm to perform a search of the index using the second vector as an input query to the search algorithm to determine a first code recommendation of the set of first code recommendations that most closely matches the second code recommendation.

5. The method of claim 4, further comprising:

retrieving the source metadata corresponding to the first code recommendation that most closely matches the second code recommendation from the index.

6. The method of claim 4, wherein the search algorithm is a kNN search algorithm.

7. The method of claim 1, wherein the source metadata corresponding to each of the first code recommendations comprises:

a source location of the first code recommendation;

a path within the source location where the first code recommendation can be located;

a source license of the first code recommendation;

a type of the source location of the first code recommendation; and a type of the first code recommendation.

8. A system comprising:

a memory; and a processing device operatively coupled to the memory, the processing device to:

parse a data set comprising a set of first code recommendations to remove from the set of first code recommendations, source metadata associated with each of the set of first code recommendations;

generate, based on the data set, an index comprising a vector representation of each of the set of first code recommendations by storing the vector representation for each of the set of first code recommendations in association with the source metadata associated with that first code recommendation;

in response to receiving a query, process the query using an inference model to generate a second code recommendation;

encode the second code recommendation using a natural language processing (NLP) model to generate a second vector representing the second code recommendation;

compare the second vector to the index to identify source metadata corresponding to the second code recommendation; and provide the second code recommendation and the source metadata corresponding to the second code recommendation.

9. The system of claim 8, wherein to generate the index, the processing device is further to:

encode, using the NLP model, the set of first code recommendations to generate the vector representation of each of the set of first code recommendations, the vector representation of each of the set of first code recommendations comprising a text representation of the corresponding first code recommendation of the set of first code recommendations; and generate the index, wherein the vector representation of each of the set of first code recommendations is stored in the index in association with the source metadata associated with the first code recommendation.

10. The system of claim 9, wherein the inference model is trained using a training data set that is similar to the data set but does not include source metadata corresponding to each of the set of first code recommendations.

11. The system of claim 8, wherein to compare the second vector to the index, the processing device is to:

use a search algorithm to perform a search of the index using the second vector as an input query to the search algorithm to determine a first code recommendation of the set of first code recommendations that most closely matches the second code recommendation.

12. The system of claim 11, wherein the processing device is further to:

retrieve the source metadata corresponding to the first code recommendation that most closely matches the second code recommendation from the index.

13. The system of claim 11, wherein the search algorithm is a kNN search algorithm.

14. The system of claim 8, wherein the source metadata corresponding to each of the first code recommendations comprises:

a source location of the first code recommendation;

a path within the source location where the first code recommendation can be located;

a source license of the first code recommendation;

a type of the source location of the first code recommendation; and a type of the first code recommendation.

15. A non-transitory computer-readable medium having instructions stored thereon which, when executed by a processing device, cause the processing device to:

parse a data set comprising a set of first code recommendations to remove from the set of first code recommendations, source metadata associated with each of the set of first code recommendations;

generate, based on the data set, an index comprising a vector representation of each of the set of first code recommendations by storing the vector representation for each of the set of first code recommendations in association with the source metadata associated with that first code recommendation;

in response to receiving a query, process the query using an inference model to generate a second code recommendation;

encode the second code recommendation using a natural language processing (NLP) model to generate a second vector representing the second code recommendation;

compare, by the processing device, the second vector to the index to identify source metadata corresponding to the second code recommendation; and provide the second code recommendation and the source metadata corresponding to the second code recommendation.

16. The non-transitory computer-readable medium of claim 15, wherein to generate the index, the processing device is further to:

encode, using the NLP model, the set of first code recommendations to generate the vector representation of each of the set of first code recommendations, the vector representation of each of the set of first code recommendations comprising a text representation of the corresponding first code recommendation of the set of first code recommendations; and generate the index, wherein the vector representation of each of the set of first code recommendations is stored in the index in association with the source metadata associated with the first code recommendation.

17. The non-transitory computer-readable medium of claim 16, wherein the inference model is trained using a training data set that is similar to the data set but does not include source metadata corresponding to each of the set of first code recommendations.

18. The non-transitory computer-readable medium of claim 15, wherein to compare the second vector to the index, the processing device is to:

use a search algorithm to perform a search of the index using the second vector as an input query to the search algorithm to determine a first code recommendation of the set of first code recommendations that most closely matches the second code recommendation.

19. The non-transitory computer-readable medium of claim 18, wherein the processing device is further to:

retrieve the source metadata corresponding to the first code recommendation that most closely matches the second code recommendation from the index.

20. The non-transitory computer-readable medium of claim 15, wherein the source metadata corresponding to each of the first code recommendations comprises:

a source location of the first code recommendation;

a path within the source location where the first code recommendation can be located;

a source license of the first code recommendation;

a type of the source location of the first code recommendation; and a type of the first code recommendation.

* * * * *